(12) United States Patent
Shekar et al.

(10) Patent No.: US 9,619,899 B2
(45) Date of Patent: Apr. 11, 2017

(54) DISTINGUISHING BETWEEN STOCK KEEPING UNITS USING HOUGH VOTING METHODOLOGY

(71) Applicants: Bharathi Shekar, Bangalore (IN); Sri Kaushik Pavani, Chennai (IN); Anshul Garg, Haryana (IN); Michael J. Gormish, Redwood City, CA (US)

(72) Inventors: Bharathi Shekar, Bangalore (IN); Sri Kaushik Pavani, Chennai (IN); Anshul Garg, Haryana (IN); Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 170 days.

(21) Appl. No.: 14/582,046

(22) Filed: Dec. 23, 2014

(65) Prior Publication Data

US 2016/0180549 A1   Jun. 23, 2016

(51) Int. Cl.
 G06T 7/60 (2006.01)
 G06T 7/00 (2006.01)
 G06K 9/62 (2006.01)
 G06Q 10/08 (2012.01)
 G06K 9/00 (2006.01)

(52) U.S. Cl.
 CPC .......... *G06T 7/602* (2013.01); *G06K 9/00771* (2013.01); *G06K 9/6215* (2013.01); *G06K 9/6292* (2013.01); *G06Q 10/087* (2013.01); *G06T 7/0081* (2013.01)

(58) Field of Classification Search
 CPC ..... G06T 7/602; G06T 7/0081; G06K 9/6215; G06K 9/6292; G06K 9/00771; G06K 9/4633; G06K 9/6205; G06Q 10/087
 See application file for complete search history.

(56) References Cited

U.S. PATENT DOCUMENTS 5,542,031 A   7/1996  Douglass
8,411,109 B2  4/2013  Kramer
(Continued)

FOREIGN PATENT DOCUMENTS

JP   2013014423   1/2013
WO  WO2009027839  3/2009

OTHER PUBLICATIONS

European Search Report for EP Application No. EP 15 20 0861, dated May 3, 2016, 8 pages.
(Continued)

*Primary Examiner* — Jon Chang
(74) *Attorney, Agent, or Firm* — Patent Law Works LLP

(57) ABSTRACT

The disclosure includes a system and method for distinguishing between items of similar appearance that vary in size. An image recognition application receives an image including a plurality of items, identifies each item in the image, generates a region of interest for each identified item in the image, determines a dimension of the region of interest for each identified item in pixels, determines a plurality of pixel-to-physical dimension ratios for each identified item, identifies a selected pixel-to-physical dimension ratio among the plurality of pixel-to-physical dimension ratios, and determines a stock keeping unit identifier of each identified item in the image based on the selected pixel-to-physical dimension ratio and the dimension of the region of interest for each identified item.

20 Claims, 10 Drawing Sheets

(56) References Cited

U.S. PATENT DOCUMENTS

| | | | |
|---|---|---|---|
| 8,761,517 B2 | 6/2014 | Ding | |
| 8,885,916 B1* | 11/2014 | Maurer | G06K 9/6202 348/137 |
| 9,076,119 B2* | 7/2015 | Jain | G06Q 10/087 |
| 9,330,474 B1* | 5/2016 | Shekar | G06T 7/602 |
| 9,342,900 B1* | 5/2016 | Shekar | G06T 7/60 |
| 2003/0036985 A1 | 2/2003 | Soderholm | |
| 2008/0101784 A1* | 5/2008 | Hsu | G03B 13/18 396/89 |
| 2008/0187241 A1 | 8/2008 | Talati | |
| 2008/0253656 A1 | 10/2008 | Schwartzberg | |
| 2010/0226532 A1* | 9/2010 | Hayasaka | G06K 9/6203 382/103 |
| 2013/0058560 A1 | 3/2013 | Sobczak | |
| 2013/0134178 A1 | 5/2013 | Lu | |
| 2014/0003729 A1 | 1/2014 | Auclair et al. | |
| 2014/0314276 A1* | 10/2014 | Wexler | G06T 7/602 382/103 |
| 2015/0178565 A1 | 6/2015 | Rivlin | |
| 2015/0242694 A1 | 8/2015 | Miyagawa | |
| 2015/0248578 A1 | 9/2015 | Utsumi | |

OTHER PUBLICATIONS

Halcon "Solution Guide III-B 2D Measuring", dated May 1, 2012, retrieved from the Internet: http://www9.cs.tum.edu/praktika/ppbv.WS02/doc/pdf/solution_guide/solution_guide_iii_b_2d_measuring.pdf [retrieved on Apr. 25, 3016], 90 pages, MVTec Software GmbH, Munchen, Germany.

Anonymous "Camera Calibration with OpenCV", dated Oct. 27, 2014, retrieved from internet: https://web.archive.org/web/20141027064631/http://docs.opencv.org/2.4/doc/tutorials/calib3d/camera_calibration/camera_calibration.html [retrieved on Apr. 25, 2016], 9 pages, Internet Archive—WayBackMachine.

European Search Report for EP Application No. EP 15 19 9771, dated May 17, 2016, 7 pages.

Notice of Allowance for U.S. Appl. No. 14/582,030, dated Sep. 30, 2016, 8 pages.

* cited by examiner

| SKU | Product | Height (mm) | Width (mm) | Size | ▪ ▪ ▪ | Price |
|---|---|---|---|---|---|---|
| X123 | ABC Cereal | 225 | 180 | 1000 g | ▪ ▪ ▪ | $3.99 |
| Y123 | ABC Cereal | 150 | 120 | 500 g | ▪ ▪ ▪ | $2.49 |
| Z123 | ABC Cereal | 100 | 80 | 250 g | ▪ ▪ ▪ | $1.89 |
| A456 | XYZ Tea | 127 | 76 | 900 g | ▪ ▪ ▪ | $4.69 |
| B456 | XYZ Tea | 99 | 36 | 450 g | ▪ ▪ ▪ | $3.59 |
| C456 | XYZ Tea | 45 | 20 | 200 g | ▪ ▪ ▪ | $2.40 |
| ⋮ | ⋮ | ⋮ | ⋮ | ⋮ | | ⋮ |

Figure 4

DISTINGUISHING BETWEEN STOCK KEEPING UNITS USING HOUGH VOTING METHODOLOGY

BACKGROUND

Field of the Invention

The specification generally relates to identifying and distinguishing between products in an image that vary in size but have a similar product packaging. In particular, the specification relates to a system and method for determining a size of each identified product in the image based on a relationship between the pixel dimensions of a region of interest for each identified product and the physical dimensions of the identified product.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. While the location and quantity of products in retail stores can be manually tracked by a user, attempts are being made to automatically recognize the products.

Previous attempts at recognizing products have deficiencies. For example, existing image recognition techniques fail to distinguish between objects that are similar in appearance but vary in size.

SUMMARY

The techniques introduced herein overcome the deficiencies and limitations of the prior art, at least in part, with a system and method for distinguishing between items of similar appearance that vary in size. In one embodiment, the system includes an image recognition application. The image recognition application is configured to receive an image of a plurality of items and to identify each item in the image. The image recognition application is further configured to generate a region of interest for each identified item in the image and to determine a pixel dimension of the region of interest for each identified item. The image recognition application is further configured to determine a plurality of pixel-to-physical dimension ratios for each identified item using the pixel dimension of the region of interest and a plurality of possible physical dimensions associated with each identified item. The image recognition application is further configured to identify a selected pixel-to-physical dimension ratio among the plurality of pixel-to-physical dimension ratios and to determine a stock keeping unit identifier of each identified item in the image based on the selected pixel-to-physical dimension ratio and the pixel dimension of the region of interest for each identified item. The image of the plurality of items, for example, can include items of different sizes in similar packaging stocked on a shelf of a retail store.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 4 is a graphical representation of one embodiment of an example stock keeping unit (SKU) table for mapping a plurality of product attributes to each product identifier.

DETAILED DESCRIPTION

Figure 1:
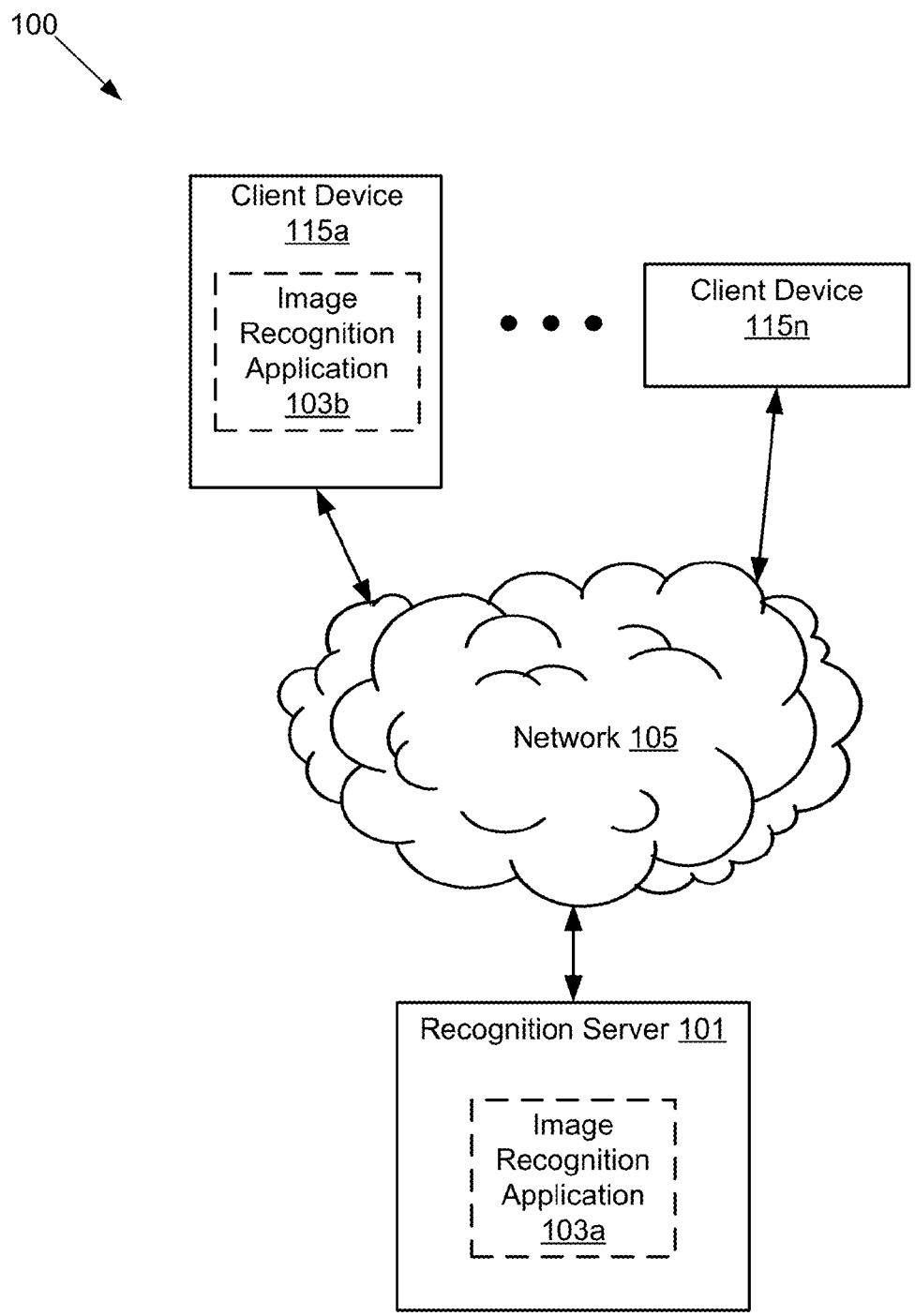
FIG. 1 is a high-level block diagram illustrating one embodiment of a system for distinguishing between stock keeping units of similar appearance that vary in size.

FIG. 1 is a high-level block diagram illustrating one embodiment of a system 100 for distinguishing between stock keeping units of similar appearance that vary in size. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of products to and from the client device 115. The images of products received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 also includes a data storage 243, which is described below in more detail with reference to FIG. 2.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 may include software and/or logic to provide the functionality for receiving query images and identifying multiple stock keeping units (SKUs) varying in size in the query images. In some embodiments, the image recognition application 103 can be implemented using programmable or specialized hardware, such as a field-programmable gate array (FPGA) or an application-specific integrated circuit (ASIC). In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as, processing the image and performing feature identification.

In some embodiments, the image recognition application 103 receives an image depicting a plurality of products. For example, the image may be of a shelf stocking breakfast cereal boxes in a retail supermarket. The image recognition application 103 identifies each product in the image and generates a region of interest for each identified product. The image recognition application 103 determines a pixel dimension of the region of interest for each identified product in the image. For example, in various embodiments, the pixel dimension of the region of interest may be a height, a width, an area, a diagonal length, etc. The image recognition application 103 determines a plurality of pixel-to-physical dimension ratios for each identified product. A pixel-to-physical dimension ratio is a relationship between a pixel dimension of a region of interest associated with an identified product in the received image and a corresponding physical dimension of the product. The image recognition application 103 identifies a selected pixel-to-physical dimension ratio among the plurality of pixel-to-physical dimension ratios. The image recognition application 103 determines a stock keeping unit identifier of each identified product in the image based on the selected pixel-to-physical dimension ratio and the dimension of the region of interest for each identified product. The operation of the image recognition application 103 and the functions listed above are described below in more detail below with reference to FIGS. 3-9.

Figure 2:
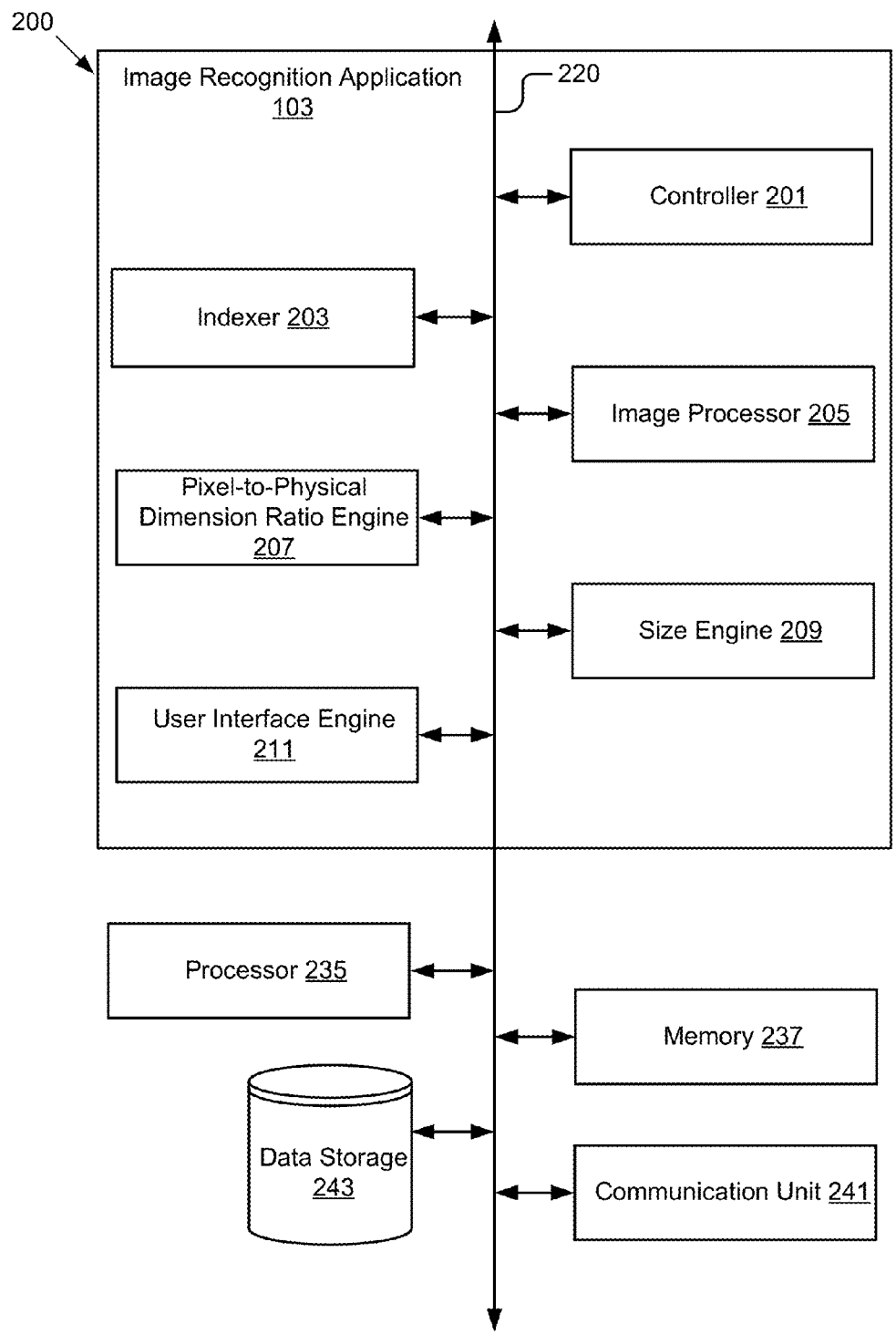
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, a communication unit 241, and data storage 243 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-ray™ etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.). It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of products. The communication unit 241 also transmits information including recognition results to the client device 115 for display, for example, in response to a query image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store a stock keeping unit (SKU) table that maps a plurality of product attributes to a product identifier. The data storage 243 may similarly store a product feature table that associates features of a product to a product identifier to support feature based query results retrieval. Additionally, the data storage 243 may store identified products in the received image, the corresponding regions of interest and the pixel dimensions of the regions of interest for each product identified in the received image. The data storage 243 may store the plurality of pixel-to-physical dimension ratios that are calculated as described herein. The data stored in the data storage 243 is described below in more detail.

In some embodiments, the image recognition application 103 may include a controller 201, an indexer 203, an image processor 205, a pixel-to-physical dimension ratio engine 207, a size engine 209 and a user interface engine 211. The components of the image recognition application 103 are communicatively coupled via the bus 220.

The controller 201 may include software and/or logic to control the operation of the other components of the image recognition application 103. The controller 201 controls the other components of the image recognition application 103 to perform the methods described below with reference to FIGS. 8-9. The controller 201 may also include software and/or logic to provide the functionality for handling communications between the image recognition application 103 and other components of the computing device 200 as well as between the components of the image recognition application 103. In some embodiments, the controller 201 can be implemented using programmable or specialized hardware including a field-programmable gate array (FPGA) or an application-specific integrated circuit (ASIC). In some embodiments, the controller 201 can be implemented using a combination of hardware and software executable by processor 235. In some embodiments, the controller 201 is a set of instructions executable by the processor 235. In some implementations, the controller 201 is stored in the memory 237 and is accessible and executable by the processor 235. In some implementations, the controller 201 is adapted for cooperation and communication with the processor 235, the memory 237 and other components of the image recognition application 103 via the bus 220.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processor 205. In another example, the controller 201 receives data for providing a graphical user interface to a user from the user interface engine 211 and sends the data to a client device 115, causing the client device 115 to present the user interface to the user.

In some embodiments, the controller 201 receives data from other components of the image recognition application 103 and stores the data in the data storage 243. For example, the controller 201 receives data including a heuristically determined selected pixel-to-physical dimension ratio from the pixel-to-physical dimension ratio engine 207 and stores the data in the data storage 243. In other embodiments, the controller 201 retrieves data from the data storage 243 and sends the data to other components of the image recognition application 103. For example, the controller 201 retrieves data including the stock keeping unit (SKU) table data from the data storage 243 and sends the retrieved data to the size engine 209.

The indexer 203 may include software and/or logic to provide the functionality for storing images of products in a database table for image recognition. In some embodiments, the indexer 203 can be implemented using programmable or specialized hardware including a field-programmable gate array (FPGA) or an application-specific integrated circuit (ASIC). In some embodiments, the indexer 203 can be implemented using a combination of hardware and software executable by processor 235. In some embodiments, the indexer 203 is a set of instructions executable by the processor 235. In some implementations, the indexer 203 is stored in the memory 237 and is accessible and executable by the processor 235. In some implementations, the indexer 203 is adapted for cooperation and communication with the processor 235, the memory 237 and other components of the image recognition application 103 via the bus 220.

In some embodiments, the indexer 203 may receive an image of a packaged product as a base image. For example, an image of a packaged product may include a cylindrical soda bottle, a rectangular breakfast cereal box, a rectangular tea box, a circular tray of sandwich cookies, etc. In some embodiments, the packaged product may have a plurality of base images associated with it. For example, the indexer 203 may receive images of the top, bottom, front, back, and sides of the packaged product as base images of the packaged product for storing in the data storage 243. The indexer 203 extracts a set of features and stores the set of features identified for the base image for image recognition. The set of features stored for image recognition can be robust to variations in scale, rotation, ambient lighting, image acquisition parameters, etc. In some embodiments, the indexer 203 maps the base image to a set of values such as, product name, product identifier, company planogram, delivery schedule, employee who stocks the product on store shelves, number of units on stock, etc. The mapping may be stored on the data storage 243 in an acceptable file format, for example an Extensible Markup Language (XML) file format. In some embodiments, the indexer 203 includes the set of features identified for each product and a relative location to a point in the base image (e.g., the location of one identified feature) where each feature occurs. In some embodiments, the indexer 203 organizes the indices to store the mappings in the data storage 243 to support a feature-based query search and result retrieval. The results of the feature-based query may be presented in a suitable file format, for example a JavaScript Object Notation (JSON) file format.

In some embodiments, the indexer 203 receives a product description including physical dimensions for a stock keeping unit from a consumer packaged goods (CPG) company. A stock keeping unit (SKU) is a distinct item, such as a product offered for sale. The stock keeping unit includes all attributes that makes the item distinguishable as a distinct product from all other items. For example, the attributes include manufacturer, size, color, packaging, a product description, material, etc. The stock keeping unit may also refer to a unique identifier that refers to the particular product or service in inventory. In some embodiments, the stock keeping units may vary in size while having a packaged cover that is visually similar in appearance. For example, breakfast cereal boxes of a particular brand "ABC" can be sold in more than one package size in supermarkets to suit different consumer needs. However, while being visually similar in appearance, each package size is a distinct stock keeping unit. The product description may be in a computer readable form, for example in a JSON (JavaScript Object Notation) format for indexing.

Using the product descriptions, or other information input by a user, the indexer 203 generates a stock keeping unit (SKU) table for a plurality of the stock keeping units having a packaged cover that is visually similar in appearance but varying in size. The SKU table maps an identity of a particular product to a plurality of product attributes. Product attributes include, for example, product name, stock keeping unit identifier, width, height, depth, area, diagonal length, product size, manufacturer brand, model number, price, product/item image, or the like. The indexer 203 stores the SKU table in the data storage 243. For example, as shown in the example of FIG. 4, a SKU table may include entries for "ABC" breakfast cereal boxes such as, a first entry for a one kilogram size of "ABC" breakfast cereal box correspondingly mapped to a height of 225 mm, a width of 180 mm, a SKU identifier "X123," etc., a second entry for a 500 gram size of "ABC" breakfast cereal box correspondingly mapped to a height of 150 mm, a width of 120 mm, a SKU identifier "Y123," etc., and a third entry for a 250 gram size of "ABC" breakfast cereal box correspondingly mapped to a height of 100 mm, a width of 80 mm, a SKU identifier "Z123," etc. Although not shown, it will be understood that the SKU table shown in FIG. 4 may include separate entries for other products such as, tea packets, cookies, sodas, etc. For example, the SKU table may include entries for "XYZ" tea packets such as, a fourth entry for a 900 gram size of "XYZ" tea packet correspondingly mapped to a height of 127 mm, a width of 76 mm, a SKU identifier "A456", etc. In other embodiments, the indexer 203 stores the dimensions of the products in the SKU table in other system of measurements such as, inches, feet, centimeters, meters, etc. and the size of the products in other system of measurements such as, liters, gallons, ounces, pounds, kilograms, fluid ounces, etc.

The image processor 205 may include software and/or logic to provide the functionality for receiving and processing images of products captured on a shelf in retail stores. In some embodiments, the image processor 205 can be implemented using programmable or specialized hardware including a field-programmable gate array (FPGA) or an application-specific integrated circuit (ASIC). In some embodiments, the image processor 205 can be implemented using a combination of hardware and software executable by the processor 235. In some embodiments, the image processor 205 is a set of instructions executable by the processor 235. In some implementations, the image processor 205 is stored in the memory 237 and is accessible and executable by the processor 235. In some implementations, the image processor 205 is adapted for cooperation and communication with the processor 235, the memory 237 and other components of the image recognition application 103 via the bus 220.

In some embodiments, the image processor 205 receives an image as a query from a user. The image processor 205 may process individual images serially or in parallel. In some embodiments, the image processor 205 may stitch multiple images received from the user into a single query image for processing. The query image may be received for recognition and may include multiple items of interest. For example, the query image can be an image of packaged products on a shelf (e.g., coffee packages, breakfast cereal boxes, soda bottles, etc.) in a retail store. The packaged product may include textual and pictorial information printed on its surface that distinguishes it from other items on the shelf. The packaged product may also sit in an arbitrary orientation on the shelf at any given time. For example, a box-like packaged product such as, a breakfast cereal box might be positioned with the front, the back, the top, the bottom, or the sides of the breakfast cereal box exposed to the user looking at the shelf. In some cases, each possible position of the breakfast cereal box on the shelf with the front, the back, the top, the bottom, and the sides can be placed rotated either 0 degrees or 90 degrees to the shelf. In another example, a cylindrically packaged product such as, a chocolate chip cookies package might be positioned rotated on its horizontal axis with the textual and pictorial information printed on its surface partially exposed to the user looking at the shelf. In some embodiments, the image processor 205 determines whether the received image is optimal for recognition and instructs the user interface engine 211 to generate data for instructing the user to retake the image of the shelf if a section of the image taken has limited information for complete recognition (e.g., packaged products on top shelf is cut off), the image is too blurry, the image has an illumination artifact (e.g., excessive reflection), etc.

Figure 3:
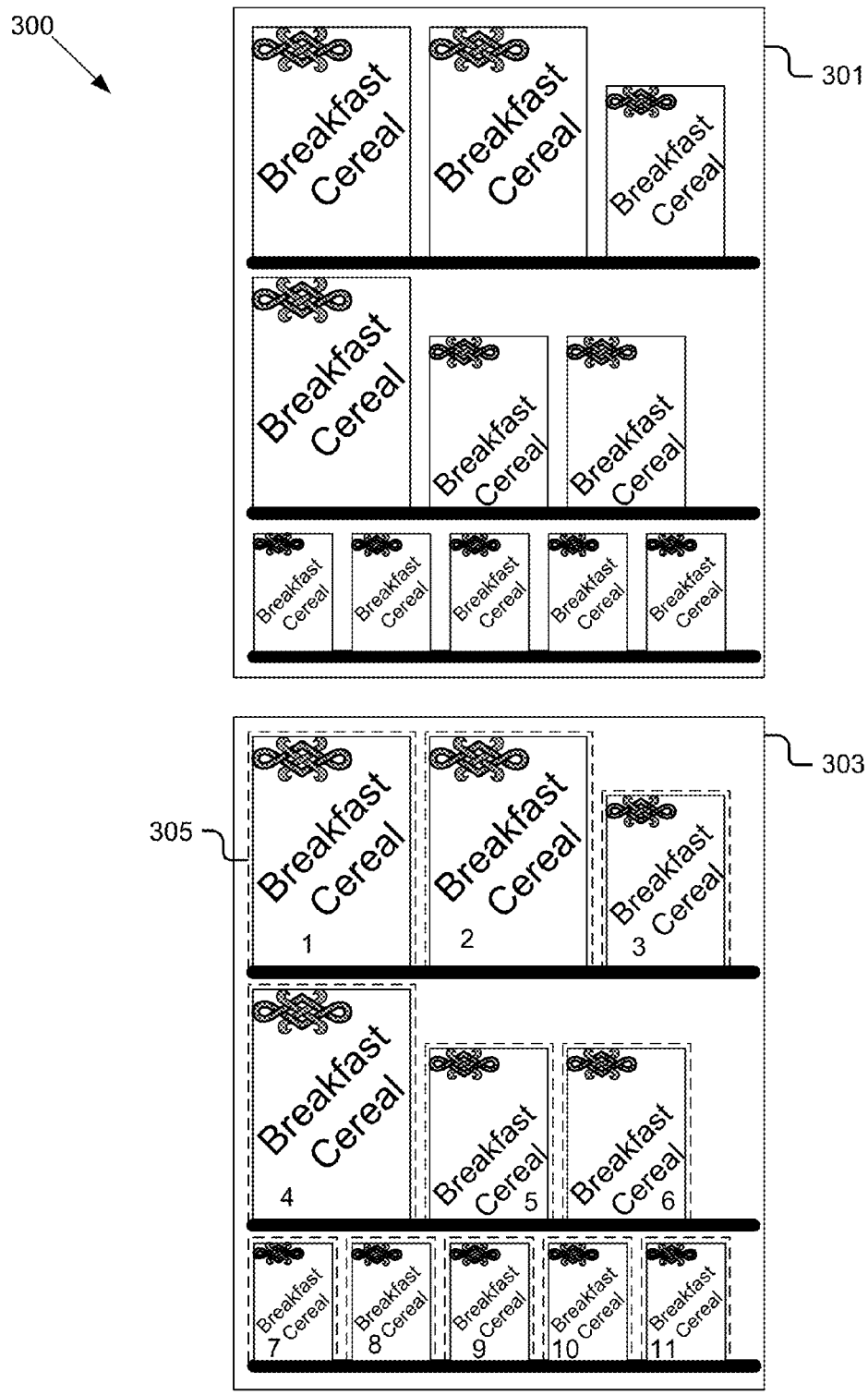
FIG. 3 is a graphical representation of one embodiment of processing an image of a plurality of products and generating a region of interest for each identified product.

In some embodiments, the image processor 205 extracts features from the received image and matches the extracted features to those features stored in an electronic database table for recognition. The image processor 205 identifies the products in the received image matching the stored features and determines an orientation of the identified products in the received image. For example, the image processor 205 may match the products in the received image of FIG. 3 to the "front" base image of the product in the same orientation as stored in the database table. The image processor 205 returns the matched products and an associated region of interest (ROI) bordering each of the matched products in the received image. A region of interest can be of any shape, for example, a circle with a center point and a diameter, a rectangular shape of a width, a height and one or more reference points for the region (e.g., a center point, one or more corner points for the region), etc. In some embodiments, the image processor 205 identifies each region of interest associated with the identified products in the image in a numbered sequence. For example, as shown in the example of FIG. 3 which is described in more detail below, the image processor 205 identifies 11 "ABC" breakfast cereal boxes in an image of breakfast cereal boxes on a shelf and returns 11 rectangular polygon ROIs, one for each of the "ABC" breakfast cereal boxes. The 11 "ABC" breakfast cereal boxes in the image may have the same product packaging while varying in content size. The 11 "ABC" rectangular polygon ROIs may be numbered in a sequence. In another example, the image processor 205 identifies three soda bottles in a received image. The three soda bottles may vary in volume. The image processor 205 returns three polygon ROIs associated with the exposed labeling containing pictorial and textual information on each one of the soda bottles. In some embodiments, the image processor 205 stores all the identified products in the received image and their corresponding region of interests in the data storage 243.

Figure 5:
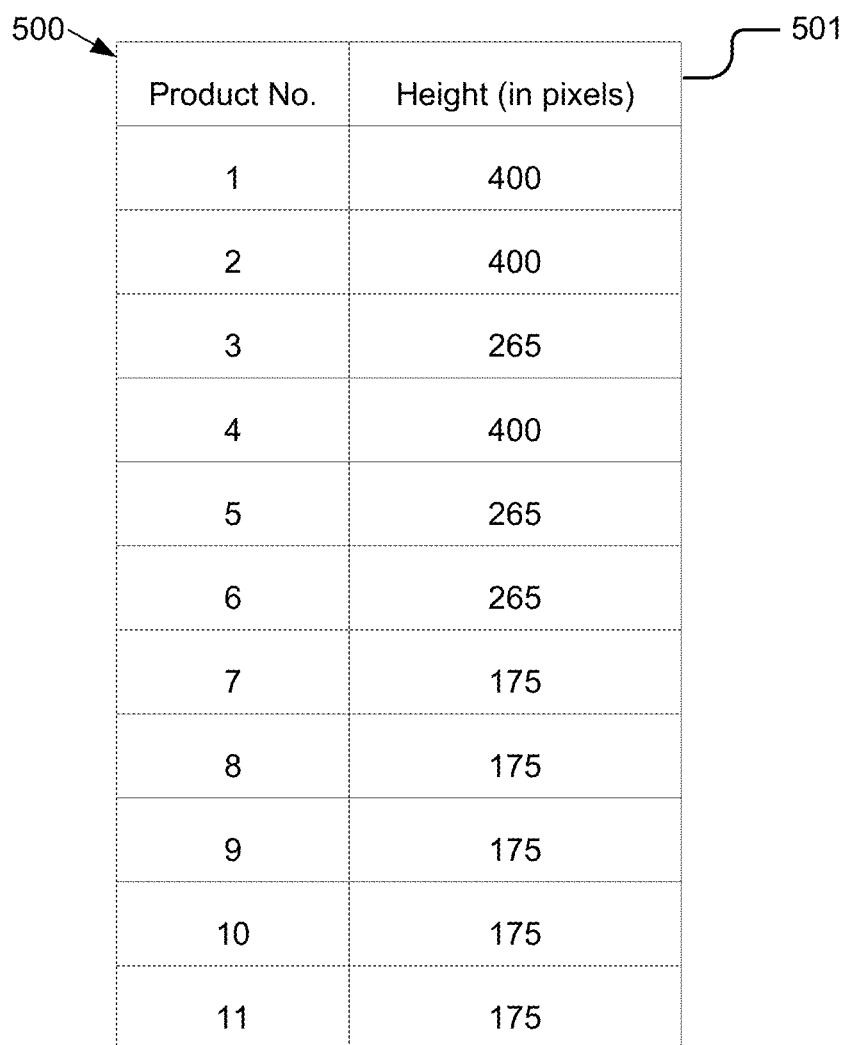
FIG. 5 is a graphical representation of one embodiment of an example pixel dimension table listing pixel dimensions of identified products in the image.

To distinguish between products in the image that vary only in size, the image processor 205 determines pixel dimensions of each identified product in the received image. In some embodiments, the image processor 205 determines the pixel dimensions of the region of interest associated with the identified product in the received image. For example, the image processor matches each of the different breakfast cereal boxes in the example of FIG. 3 to associated "front" base images as stored in the data storage 243. As shown in the example of FIG. 5, the image processor 205 then associates the vertical pixels of the region of interest to the height of the breakfast cereal box and determines the height, in pixels, of different breakfast cereal boxes identified in the received image. In another example, the image processor 205 may associate the horizontal pixels of the region of interest to the width of the breakfast cereal box. In other such examples, the image processor 205 may determine an area in pixels, a diagonal length in pixels, etc. of the region of interest bordering the identified product in the received image. In some embodiments, the image processor 205 identifies the orientation of the identified products in the received image which can affect the correspondence of the pixel dimensions of the region of interest associated with the identified products with the actual physical dimensions of the products. For example, the image processor 205 matches an "ABC" breakfast cereal box in the image to a "top" base image stored for "ABC" breakfast cereal boxes in the data storage 243 and identifies that the "ABC" breakfast cereal box is oriented 90 degrees on the shelf In such a case, the image processor 205 may associate the vertical pixels of the region of interest associated with the breakfast cereal box to the width of the breakfast cereal box and the horizontal pixels of the region of interest associated with the breakfast cereal box to the depth of the breakfast cereal box. In some embodiments, the image processor 205 sends data including the pixel dimensions of the region of interest associated with each identified product in the received image to the pixelto-physical dimension ratio engine 207 and the size engine 209 for use in distinguishing between products in the image that vary only in size.

The pixel-to-physical dimension ratio engine 207 may include software and/or logic to provide the functionality for determining a relationship between a pixel dimension of a region of interest associated with an identified product in the received image and its actual physical dimension. In some embodiments, the pixel-to-physical dimension ratio engine 207 can be implemented using programmable or specialized hardware including a field-programmable gate array (FPGA) or an application-specific integrated circuit (ASIC). In some embodiments, the pixel-to-physical dimension ratio engine 207 can be implemented using a combination of hardware and software executable by processor 235. In some embodiments, the pixel-to-physical dimension ratio engine 207 is a set of instructions executable by the processor 235. In some implementations, the pixel-to-physical dimension ratio engine 207 is stored in the memory 237 and is accessible and executable by the processor 235. In some implementations, the pixel-to-physical dimension ratio engine 207 is adapted for cooperation and communication with the processor 235, the memory 237 and other components of the image recognition application 103 via the bus 220.

In some embodiments, the pixel-to-physical dimension ratio engine 207 heuristically identifies a relationship between a pixel dimension of a region of interest associated with an identified product in the received image and a corresponding physical dimension of the product (i.e., pixel-to-physical dimension ratio) by a voting procedure. For example, the voting procedure may be based on Hough transform voting. Typically, Hough transform voting is used in analysis of digital images for detecting shapes such as, straight lines, circle or ellipses. Hough transform voting is executed in a set of all possible combinations of values for all different parameters contained within a mathematical model of the problem. In Hough transform voting, each possible combination casts an individual vote, from which a selected value may be obtained as local maxima when it receives a maximum number of votes among all other possible combinations.

The following example is used to illustrate the voting procedure in determining the pixel-to-physical dimension ratio. The pixel-to-physical dimension ratio engine 207 receives the pixel dimensions of each identified product in the received image from the image processor 205. For example, the pixel-to-physical dimension ratio engine 207 receives a height in pixels for "ABC" breakfast cereal boxes observed in three predominant sizes (e.g., 400, 265, and 175) in the received image. In some embodiments, the pixel-to-physical dimension ratio engine 207 accesses a SKU table in the data storage 243 that identifies a set of physical dimensions associated with the identified products differing only in size in the received image. The pixel-to-physical dimension ratio engine 207 determines a pixel-to-physical dimension ratio (PPR) by dividing the pixel dimension of the region of interest for the identified product by the physical dimension of the identified product. For example, if the height in pixels for an "ABC" breakfast cereal box is 400 and one candidate physical height is 225 mm retrieved from the SKU table, the pixel-to-physical dimension ratio engine 207 determines the pixel-to-physical dimension ratio using these two parameters to be 1.77. In another example, the pixel-to-physical dimension ratio engine 207 may determine a pixel-to-physical dimension ratio using the width, in pixels, of the region of interest for the identified product and a physical width of the breakfast cereal box. In some embodiments, the pixel-to-physical dimension ratio that is determined using the width, in pixels, may be different from the pixel-to-physical dimension ratio that is determined using the height, in pixels, due to pixel aspect ratio (PAR). The pixel aspect ratio is a mathematical ratio describing how the width of a pixel in an image compares to the height of the pixel. The pixel aspect ratio remains constant for varying sizes of a packaged product in a single image.

Figure 6:
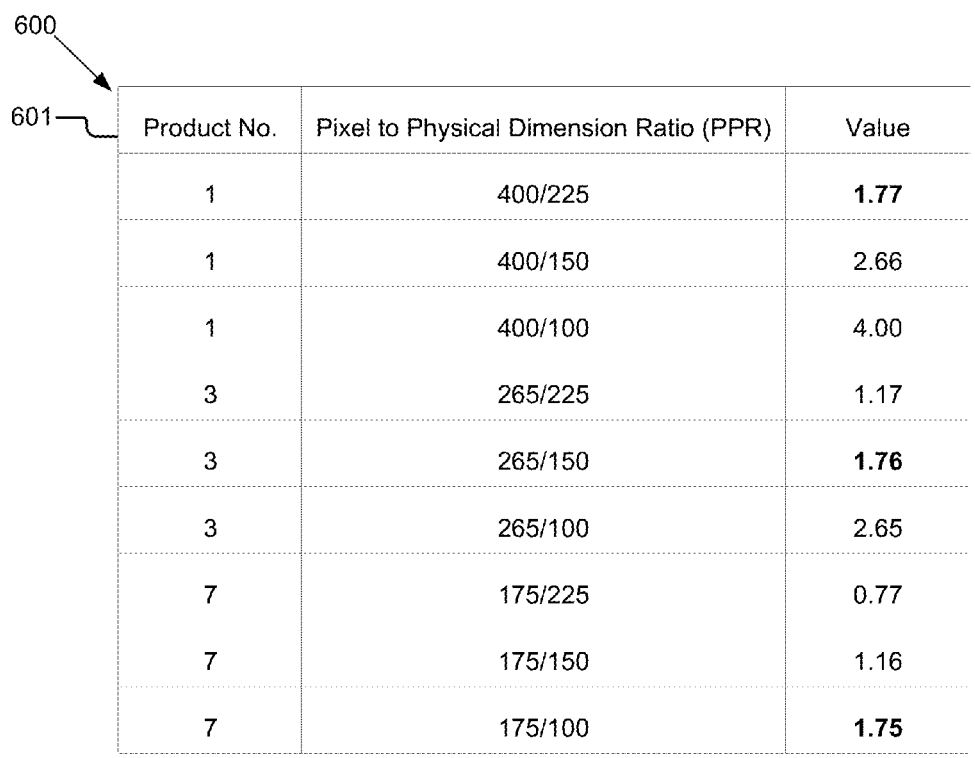
FIG. 6 is a graphical representation of one embodiment of an example pixel-to-physical dimension ratio table illustrating heuristically determining a selected pixel-to-physical dimension ratio.

In some embodiments, as a first portion of the voting procedure, the pixel-to-physical dimension ratio engine 207 determines a plurality of pixel-to-physical dimension ratios (PPRs) using all possible combinations of the pixel dimension of the region of interest for each identified product with the set of physical dimensions retrieved from the SKU table for each identified product in the received image. For example, as shown in the example of FIG. 6 which is described in more detail below, a first "ABC" breakfast cereal box (e.g., product number '1' in FIG. 3) with a first height, in pixels (400) may have three known associated candidate heights (225 mm, 150 mm, and 100 mm) retrieved from the SKU table for "ABC" breakfast cereals. A set of possible pixel-to-physical dimension ratios can then be determined to be 400/225=1.77, 400/150=2.66, and 400/100=4. Similarly, a second "ABC" breakfast cereal box (e.g., product number '3' in FIG. 3) with a second height, in pixels (265) may generate another set of possible pixel-to-physical dimension ratios of 265/225=1.17, 265/150=1.76, and 265/100=2.65. A third "ABC" breakfast cereal box (e.g., product number '7' in FIG. 3) with a third height, in pixels (175) may generate another set of possible pixel-to-physical dimension ratios of 175/225=0.77, 175/150=1.166, and 175/100=1.75. Therefore, for each breakfast cereal box identified in the received image, a set of three pixel-to-physical dimension ratios are determined and stored (e.g., third column in FIG. 6). If there are 11 "ABC" breakfast cereal boxes as identified in the received image in FIG. 3, the pixel-to-physical dimension ratio engine 207 may compute 33 possible pixel-to-physical dimension ratios in total. As a second portion of the voting procedure, the pixel-to-physical dimension ratio engine 207 counts a vote for each pixel-to-physical dimension ratio in the plurality of pixel-to-physical dimension ratios determined using the identified products in the received image. The pixel-to-physical dimension ratio engine 207 identifies an approximate value for the selected pixel-to-physical dimension ratio based on the pixel-to-physical dimension ratio that received a maximum number of votes among the plurality of pixel-to-physical dimension ratios. For example, as shown in the example of third column of FIG. 6, an approximate value of a pixel-to-physical dimension ratio of 1.77 received a maximum number of three votes. The pixel-to-physical dimension ratios such as, 1.75, 1.76 and 1.77 contribute toward the approximate PPR value of 1.77 and are thus included in the total vote count for the approximate PPR value of 1.77. The pixel-to-physical dimension ratio engine 207 identifies 1.77 as the selected pixel-to-physical dimension ratio to use in determining the size of a product in the image. In other words, the pixel-to-physical dimension ratio of 1.77 occurs with a maximum frequency among the plurality of pixel-to-physical dimension ratios.

In some embodiments, the pixel-to-physical dimension ratio engine 207 identifies a relationship between a pixel dimension of a region of interest associated with an identified product in the received image and a corresponding physical dimension of the product (i.e., pixel-to-physical dimension ratio) by a statistical analysis of the pixel-tophysical dimension ratios of various identified products in the image. The pixel-to-physical dimension ratio engine 207 receives a list of identified products in the received image and their corresponding pixel dimensions from the image processor 205. The pixel-to-physical dimension ratio engine 207 also receives a physical dimension associated with each identified product in the list from the image processor 205. For example, as shown in the example of FIG. 3, the image processor 205 may match "ABC" breakfast cereal box (product '1') to any one of the first three row entries of the SKU table in FIG. 4 that pertain to "ABC" breakfast cereal boxes. As an illustration, the image processor may return the information in the second row of the SKU table as a match for product '1'. The pixel-to-physical dimension ratio engine 207 may then use a physical dimension of the product '1' (e.g., height, 150 mm) to determine a pixel-to-physical dimension ratio. In one embodiment, the pixel-to-physical dimension ratio engine 207 may use the physical dimensions associated with the first and the third rows in the SKU table as alternate physical dimensions.

In some embodiments, the pixel-to-physical dimension ratio engine 207 determines a pixel-to-physical dimension ratio for each identified product in the list using the pixel dimensions and the corresponding physical dimensions associated with each identified product in the list. In other embodiments, the pixel-to-physical dimension ratio engine 207 only determines a pixel-to-physical dimension ratio for a subset of the identified products in the list. Using the pixel-to-physical dimension ratios determined from the list, the pixel-to-physical dimension ratio engine 207 performs a statistical analysis of the pixel-to-physical dimension ratios to determine a pixel-to-physical dimension ratio for the image. For example, the pixel-to-physical dimension ratio engine 207 determines a median pixel-to-physical dimension ratio using all the pixel height-to-physical height ratios determined for the different "ABC" breakfast cereal boxes of FIG. 3. In other embodiments, the pixel-to-physical dimension ratio engine 207 may determine other statistics such as mean and standard deviation of the pixel-to-physical dimension ratios.

In some embodiments, the pixel-to-physical dimension ratio engine 207 uses the median pixel-to-physical dimension ratio to identify outliers in the list of identified products and to generate a revised list of identified products that is accurate in terms of recognition. For example, the pixel-to-physical dimension ratio engine 207 compares the median pixel-to-physical dimension ratio to compare against each one of the pixel-to-physical dimension ratios determined for the list of identified products and notifies the image processor 205 of a potential identification error if the pixel-to-physical dimension ratio for a product differs from the median pixel-to-physical dimension ratio by a certain margin. In some embodiments, the pixel-to-physical dimension ratio engine 207 notifies the image processor 205 of pixel-to-physical dimension ratios that are off by more than 20 percent of the median pixel-to-physical dimension ratio.

In some embodiments, the pixel-to-physical dimension ratio engine 207 stores the selected pixel-to-physical dimension ratio or the median pixel-to-physical dimension ratio in the data storage 243. In some embodiments, the pixel-to-physical dimension ratio engine 207 sends the selected pixel-to-physical dimension ratio or the median pixel-to-physical dimension ratio to the size engine 209.

The size engine 209 may include software and/or logic to provide the functionality for determining a size of each identified product in the received image. In some embodiments, the size engine 209 can be implemented using programmable or specialized hardware including a field-programmable gate array (FPGA) or an application-specific integrated circuit (ASIC). In some embodiments, the size engine 209 can be implemented using a combination of hardware and software executable by processor 235. In some embodiments, the size engine 209 is a set of instructions executable by the processor 235. In some implementations, the size engine 209 is stored in the memory 237 and is accessible and executable by the processor 235. In some implementations, the size engine 209 is adapted for cooperation and communication with the processor 235, the memory 237 and other components of the image recognition application 103 via the bus 220.

In some embodiments, the size engine 209 receives the selected pixel-to-physical dimension ratio or the median pixel-to-physical dimension ratio from the pixel-to-physical dimension ratio engine 207 and the pixel dimension of the region of interest of each identified product in the received image from the image processor 205. The size engine 209 determines the size of each identified product in the received image based on the selected pixel-to-physical dimension ratio or the median pixel-to-physical dimension ratio and the pixel dimension for each identified product in the received image. In some embodiments, the size engine 209 determines an actual physical dimension corresponding to each identified product by dividing the pixel dimension for each identified product by the selected pixel-to-physical dimension ratio or the median pixel-to-physical dimension ratio. The formula to determine the actual physical dimension of a product can be formally stated as:

$$\text{size in physical dimension} = \frac{\text{Size in pixels}}{\text{pixel-to-physical dimension ratio}}$$

Figure 7:
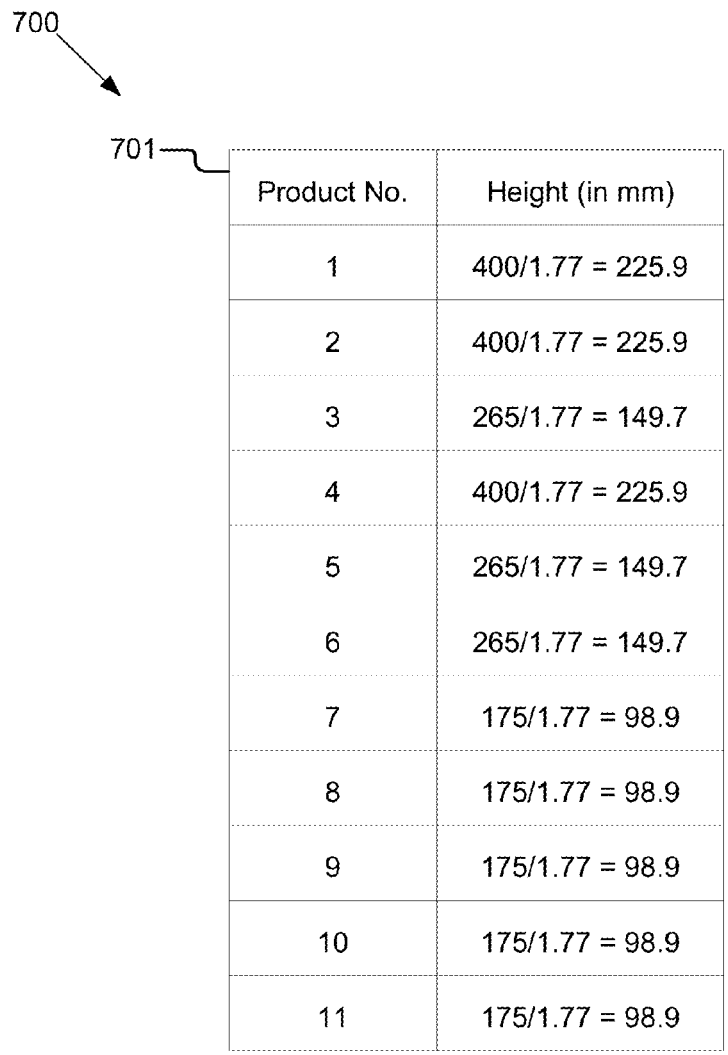
FIG. 7 is a graphical representation of one embodiment of an example physical dimension table listing physical dimensions of identified products in the image.

For example, as shown in the example of FIG. 7 which is described in more detail below, if the height in pixels for a first "ABC" breakfast cereal box (e.g., product number '1' in FIG. 3) identified in the received image is 400 and the pixel-to-physical dimension ratio is determined to be 1.77, then the actual physical height is determined to be 400/1.77=225.9 mm. In another example, if the height in pixels for a second "ABC" breakfast cereal box (e.g., product number '3' in FIG. 3) identified in the received image is 265 and the pixel-to-physical dimension ratio is determined to be 1.77, then the actual physical height is determined to be 265/1.77=149.7 mm. In yet another example, if the height in pixels for a third "ABC" breakfast cereal box (e.g., product number '7' in FIG. 3) identified in the received image is 175 and the pixel-to-physical dimension ratio is determined to be 1.77, then the actual physical height is determined to be 175/1.77=98.9 mm. In other embodiments, in addition to or instead of height, the size engine 209 may determine other actual physical dimensions such as, width, area, diagonal length, etc. for each identified product in the received image based on corresponding selected pixel-to-physical dimension ratios or the median pixel-to-physical dimension ratio determined by the pixel-to-physical dimension ratio engine 207.

In some embodiments, the size engine 209 retrieves the information from the SKU table from the data storage 243. In some embodiments, the size engine 209 uses the physical dimension determined for an identified product in the received image to look up a closest matching physical dimension stored for the identified product in the SKU table. For example, the size engine 209 identifies that a first "ABC" breakfast cereal box with a calculated physical height of 225.9 mm is closest to a height 225 mm associated with a one kilogram "ABC" breakfast cereal box in the SKU table. In another example, the size engine 209 identifies that a second "ABC" breakfast cereal box with a calculated physical height of 149.7 mm is closest to a height of 150 mm associated with a 500 gram "ABC" breakfast cereal box in the SKU table. In yet another example, the size engine 209 identifies that a third "ABC" breakfast cereal box with a calculated physical height of 98.9 mm is closest to a height of 100 mm associated with a 250 gram "ABC" breakfast cereal box in the SKU table. In some embodiments, the size engine 209 may use other physical dimensions such as, width, area, diagonal height, etc. to improve accuracy in distinguishing the identified products varying only in size in the received image.

In some embodiments, the size engine 209 uses the closest matching physical dimension of each identified product to retrieve stock keeping unit information from the SKU table. To retrieve the stock keeping unit information, the size engine 209 determines a SKU identifier for the identified product based on the closest matching physical dimension. For example, using the height of 225 mm associated with a one kilogram "ABC" breakfast cereal box, the size engine 209 retrieves a stock keeping unit identifier "X123" from the SKU table for the one kilogram "ABC" breakfast cereal box.

One advantage of using the techniques introduced here to distinguish between products of varying size in an image of a retail shelf is that the plurality of products can be audited by a sales executive more quickly and accurately. In some embodiments, the size engine 209 uses the SKU identifier of each identified product in the image to retrieve planogram information corresponding to that product from the data storage 243. The planogram describes a product's location in an aisle and on a shelf and the quantity of the product to be stocked at that location. The planogram can be provided to the sales executive with an image of the shelf identifying products in the image for the sales executive to more easily determine planogram compliance. One advantage of effecting planogram compliance using the techniques described in this disclosure is increased sales due to the product being in the right place at the right time. Additionally, the customer loyalty to a particular product is not lost as the product is rearranged and/or restocked on the retail shelves to ensure its availability to the customers.

Moreover, the image including identified products allows the sales executive to more easily determine whether changes in an item inventory of particular sizes identified in the image exceed a threshold. For example, statistics may provide details that a 250 gram size breakfast cereal boxes sell faster than those of other sizes, etc. In another example, the statistics may provide details that a promotional sale of a tea pack with 20% free tea bags sells faster than other tea packs, etc. Consequently, this is advantageous in that it is easier to infer trends in sales and performances of trade promotions in retail stores which can help retail managers to alter and/or reallocate promotion budgets.

The user interface engine 211 may include software and/or logic for providing user interfaces to a user. In some embodiments, the user interface engine 211 can be implemented using programmable or specialized hardware including a field-programmable gate array (FPGA) or an application-specific integrated circuit (ASIC). In some embodiments, the user interface engine 211 can be implemented using a combination of hardware and software executable by processor 235. In some embodiments, the user interface engine 211 is a set of instructions executable by the processor 235. In some implementations, the user interface engine 211 is stored in the memory 237 and is accessible and executable by the processor 235. In some implementations, the user interface engine 211 is adapted for cooperation and communication with the processor 235, the memory 237 and other components of the image recognition application 103 via the bus 220.

In some embodiments, the user interface engine 211 receives instructions from the image processor 205 to generate a graphical interface that instructs the user to capture image of a retail shelf stocking products. In some embodiments, responsive to a user of a client device 115 capturing the image including products, the user interface engine 211 receives information including product identification from the image processor 205 and generates a polygon outline to identify the region of interest around each identified product. In other embodiments, the user interface engine 211 sends graphical user interface data to an application (e.g., a browser) in the client device 115 via the communication unit 241 causing the application to display the data as a graphical user interface.

FIG. 3 is a graphical representation 300 of one embodiment of processing an image including a plurality of products and generating a region of interest for each identified product. The graphical representation 300 can be displayed on a client device 115, for example, a smartphone associated with the user capturing the image. The graphical representation 300 includes an image 301 of a shelf stocking a plurality of "ABC" breakfast cereal boxes. As depicted in the example of FIG. 3, the products may have a similar appearance and vary only in size. In some embodiments, the image 301 is sent to the image processor 205 for image recognition. The graphical representation 300 includes the processed image 303 identifying the breakfast cereal boxes in a numbered sequence. The processed image 303 includes a region of interest 305 bordering each "ABC" breakfast cereal box. The region of interest 305 provides an estimation for the dimension, in pixels, of each identified product in the processed image 303.

FIG. 4 is a graphical representation 400 of one embodiment of an example stock keeping unit (SKU) table for mapping a plurality of attributes of a product to the product identity. Referring to FIG. 4, the graphical representation 400 includes a SKU table 401 mapping the "ABC" breakfast cereal product of different varieties as separate row entries in the SKU table 401. Each row in the SKU table maps an "ABC" breakfast cereal product to the plurality of the attributes associated with the "ABC" breakfast cereal product. The attributes are represented under the columns of the SKU table 401 and may include, for example, SKU identifier, product name, height, width, depth, area, diagonal length, size, price, product/item image, etc. In some embodiments, the indexer 203 may update the SKU table 401 with a plurality of row entries to include additional products such as, tea packets, cookies, sodas, etc.

FIG. 5 is a graphical representation 500 of one embodiment of an example pixel dimension table listing a pixel dimension of each identified product in the image. Referring to FIG. 5, the graphical representation 500 includes a table 501 listing a height, in pixels, of a region of interest associated with each identified product in the processed image 303 from FIG. 3. In some embodiments, the image processor 205 generates the table 501 listing the height, in pixels. In other examples, the table 501 may include a width, a diagonal length, an area, etc. as additional columns.

FIG. 6 is a graphical representation 600 of one embodiment of an example pixel-to-physical dimension ratio table illustrating heuristically determining a selected pixel-to-physical dimension ratio. Referring to FIG. 6, the graphical representation 600 includes a table 601 for determining a selected pixel-to-physical dimension ratio by a voting procedure. In some embodiments, the voting procedure may be based on Hough transform voting. In the illustrated embodiment, the table 601 includes a set of possible pixel-to-physical dimension ratios calculated for products numbered '1', '3', and '7' in the processed image 303 of FIG. 3 to illustrate the voting procedure. Products '1', '3', and '7' in FIG. 3 are an example of the three predominant sizes of breakfast cereal boxes present in the image. It can be understood that the table 601 can include the set of possible pixel-to-physical dimension ratios calculated for all of the other products that are identified in FIG. 3. In the table 601, a pixel-to-physical dimension ratio is calculated in the second column by dividing the height, in pixels, of the region of interest for the product by the physical height of the product. For example, the height, in pixels, of the product '1' (i.e., 400) is retrieved from table 501 of FIG. 5 and the set of physical heights (225 mm, 150 mm, 100 mm) are retrieved from the SKU table 401 of FIG. 4. In the table 601, the value of pixel-to-physical dimension ratios are listed in the third column and a vote is counted for each value in the voting procedure. In the third column, an approximate PPR value of 1.77 (determined from highlighted PPR values of 1.75, 1.76, and 1.77) occurs with a maximum frequency among the other listed pixel-to-physical dimension ratios and receives a maximum number of three votes. (i.e., PPR values of 1.75, 1.76, and 1.77 are included in the vote count). The approximate pixel-to-physical dimension ratio of 1.77 can be chosen as the selected pixel-to-physical dimension ratio.

FIG. 7 is a graphical representation of one embodiment of an example physical dimension table listing physical dimensions of identified products in the image. Referring to FIG. 7, the graphical representation 700 includes a table 701 that lists actual physical height for each identified product by dividing the dimension, in pixels, for each identified product by the selected pixel-to-physical dimension ratio. For example, if the height in pixels for a first "ABC" breakfast cereal box identified in the processed image 303 in FIG. 3 is 400 and the approximate value of pixel-to-physical dimension ratio is determined to be 1.77, then the actual physical height of the first "ABC" breakfast cereal box is determined to be 400/1.77=225.9 mm. In some embodiments, the size engine 209 uses the actual physical height corresponding to each identified product to look up the SKU table for distinguishing the sizes of each identified product in the processed image 303. For example, the size engine 209 identifies that the first "ABC" breakfast cereal box with a calculated physical height of 225.9 mm matches closely to a physical height of 225 mm indexed for the "ABC" breakfast cereal boxes in the SKU table. The matched physical height of 225 mm in turn maps to a one kilogram "ABC" breakfast cereal box in the SKU table.

Figure 8:
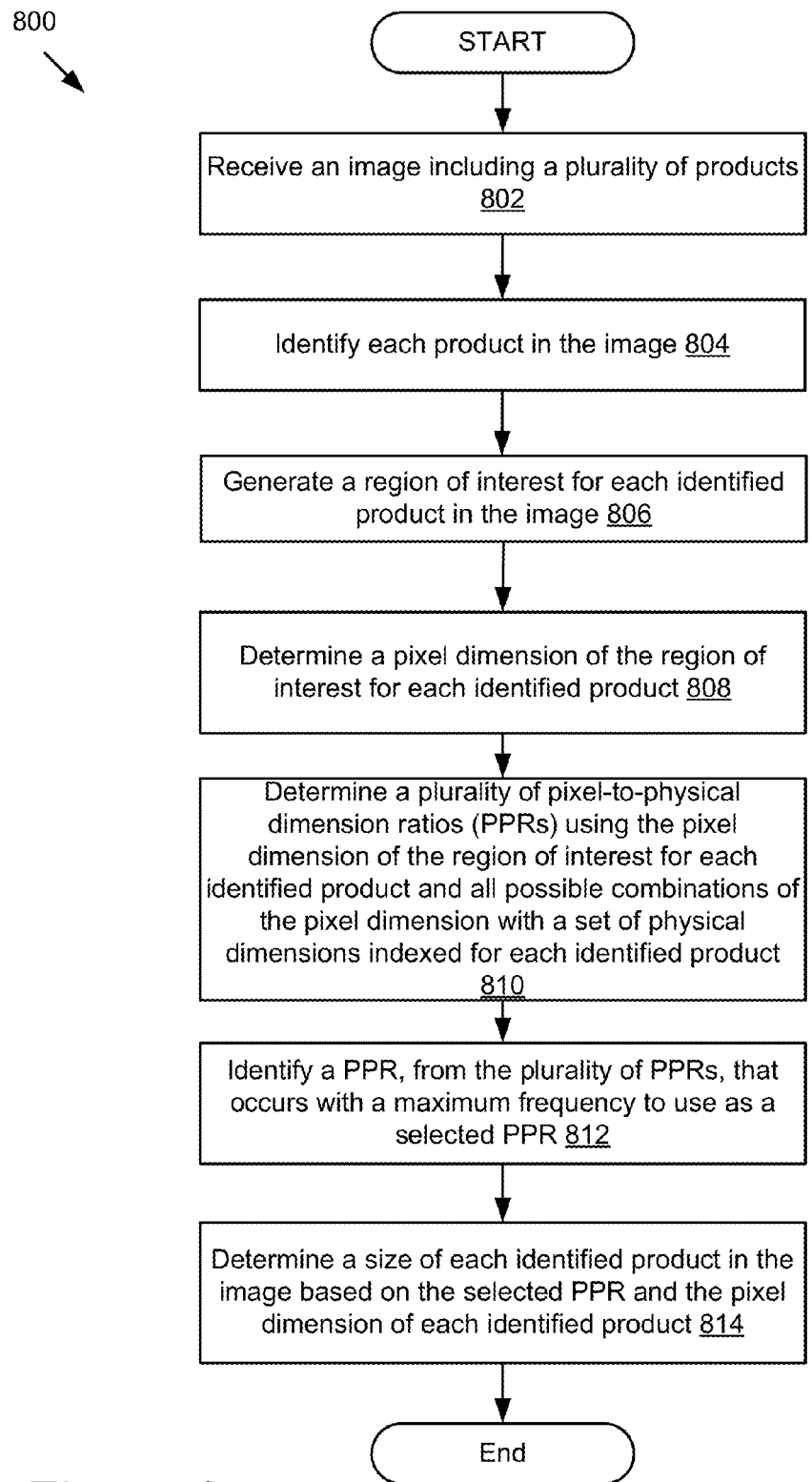
FIG. 8 is a flow diagram illustrating one embodiment of determining a size of each product in an image of a plurality of products.

FIG. 8 is a flow diagram 800 illustrating one embodiment of determining a size of each product in an image of a plurality of products. At 802, the image processor 205 receives an image including a plurality of products. The image may be received for recognition and may include multiple items of interest. For example, the image can be an image of a plurality of packaged products on a shelf (e.g., a square coffee box, a rectangular cereal box, a cylindrical package of chocolate chip cookies, etc.) in a retail store. At 804, the image processor 205 identifies each product in the image. The image processor 205 extracts features from the received image including the plurality of products and matches the extracted features to those features indexed in a database for recognition. At 806, the image processor 205 generates a region of interest for each identified product in the image. For example, the image processor 205 identifies 11 "ABC" breakfast cereal boxes in an image of breakfast cereal boxes on a shelf and returns 11 rectangular polygon ROIs bordering each one of the "ABC" breakfast cereal boxes. At 808, the image processor 205 determines a pixel dimension of the region of interest for each identified product. For example, the image processor 205 determines the height in pixels of the breakfast cereal boxes identified in the received image. In other examples, the image processor 205 may determine a width in pixels, an area in pixels, a diagonal length in pixels, etc. of the region of interest bordering the identified product in the received image.

At 810, the pixel-to-physical dimension ratio engine 207 determines a plurality of pixel-to-physical dimension ratios using the pixel dimension of the region of interest for each identified product and all possible combinations of the pixel dimension with a set of physical dimensions indexed for each identified product. At 812, the pixel-to-physical dimension ratio engine 207 identifies a pixel-to-physical dimension ratio, from the plurality of pixel-to-physical dimension ratios that occurs with a maximum frequency to use as a selected pixel-to-physical dimension ratio. The pixel-to-physical dimension ratio engine 207 identifies the selected pixel-to-physical dimension ratio by a voting procedure. For example, the voting procedure may be based on the Hough transform voting. If there are 11 breakfast cereal boxes as identified in the received image, the pixel-to-physical dimension ratio engine 207 may compute 33 possible pixel-to-physical dimension ratios and count a vote for each pixel-to-physical dimension ratio. The pixel-to-physical dimension ratio engine 207 identifies an approximate value of the pixel-to-physical dimension ratio that received a maximum number of votes among the plurality of pixel-to-physical dimension ratios as the selected pixel-to-physical dimension ratio.

At 814, the size engine 209 determines a size of each identified product in the image based on the selected pixel-to-physical dimension ratio and the pixel dimension of each identified product. The size engine 209 determines a physical dimension corresponding to each identified product by dividing the pixel dimension for each identified product by the selected pixel-to-physical dimension ratio. In some embodiments, the size engine 209 uses the physical dimension corresponding to each identified product to look up the SKU table for distinguishing the sizes of each identified product in the received image. For example, the size engine 209 identifies that an "ABC" breakfast cereal box with a calculated physical height of 225.9 mm matches closely to a physical height of 225 mm indexed for "ABC" breakfast cereal boxes in the SKU table. The matched physical height of 225 mm in turn maps to a one kilogram size "ABC" breakfast cereal box in the SKU table.

Figure 9A:
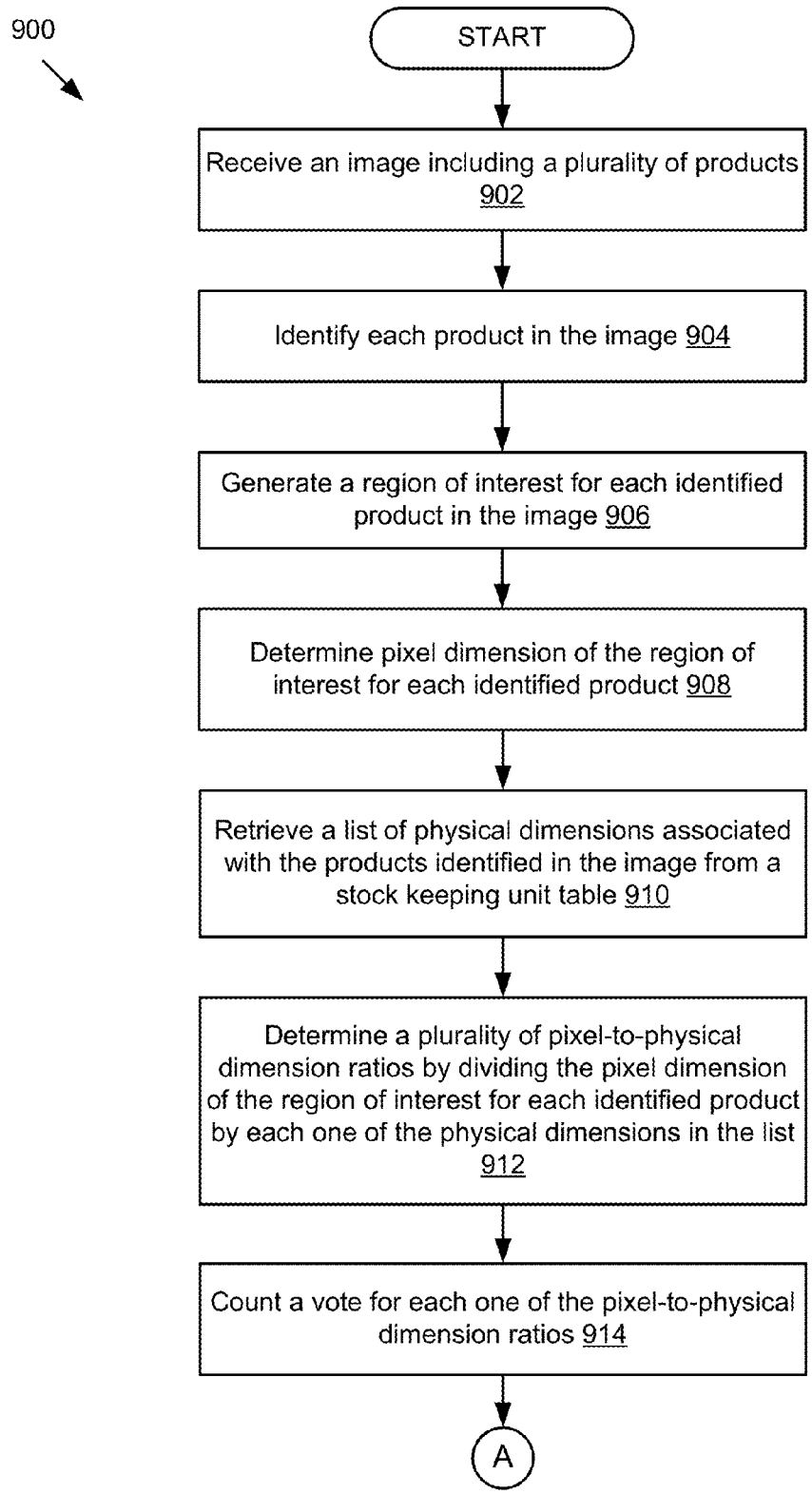
FIGS. 9A-9B are flow diagrams illustrating one embodiment of determining a stock keeping unit identifier of each product in an image of a plurality of products.
Figure 9B:
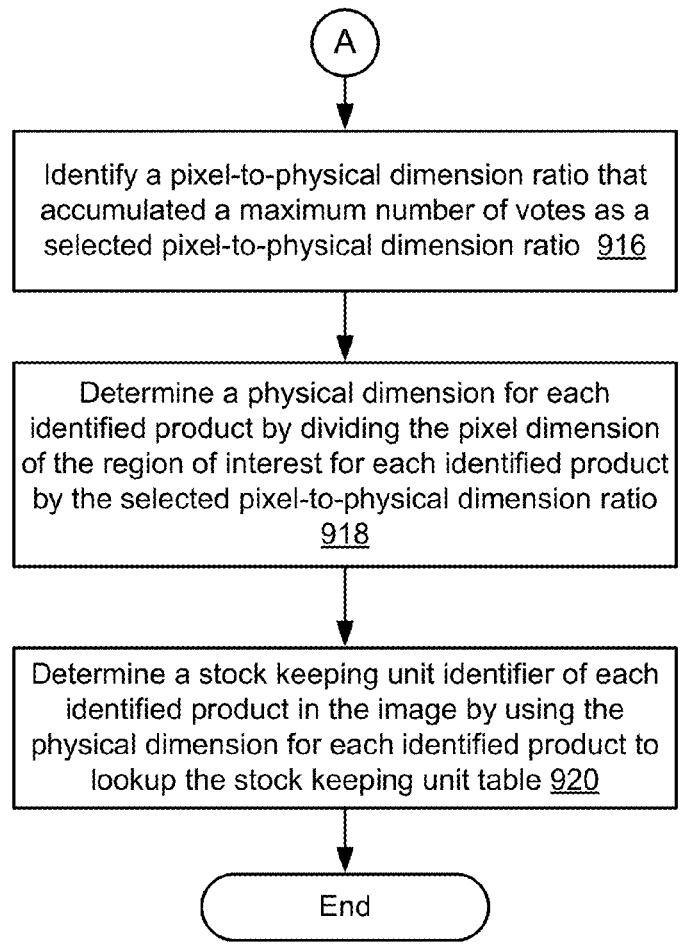

FIGS. 9A-9B are flow diagrams 900 illustrating one embodiment of determining a stock keeping unit identifier of each product in an image of a plurality of products. At 902, the image processor 205 receives an image including a plurality of products. For example, the image may be of a shelf stocking breakfast cereal boxes in a retail supermarket. At 904, the image processor 205 identifies each product in the image. The image processor 205 extracts features from the received image including the plurality of products and matches the extracted features to those features indexed in a database for recognition. For example, the image processor 205 identifies 11 "ABC" breakfast cereal boxes in the image. At 906, the image processor 205 generates a region of interest for each identified product in the image. A region of interest can be of any shape, for example, a circle with a point and a diameter, a rectangular shape of a width, a height and one or more reference points for the region (e.g., a center point, one or more corner points for the region), etc. A reference point is specified by a first coordinate value (e.g., a value in the $\vec{x}$ coordinate) and a second coordinate value (e.g., a value in the $\vec{y}$ coordinate). For example, the image processor 205 returns 11 rectangular polygon ROIs bordering each one of the 11 "ABC" breakfast cereal boxes in the image. At 908, the image processor 205 determines pixel dimension of the region of interest for each identified product. For example, the image processor 205 determines the height in pixels of three predominantly sized "ABC" breakfast cereal boxes identified in the received image to be 400, 265, and 175.

At 910, the pixel-to-physical dimension ratio engine 207 retrieves a list of physical dimensions associated with the products identified in the image from a stock keeping unit (SKU) table. For example, a SKU table may include separate entries for a one kilogram "ABC" breakfast cereal box mapped to a height of 225 mm and a width of 180 mm, a 500 gram "ABC" breakfast cereal box mapped to a height of 150 mm and a width of 120 mm, and a 250 gram "ABC" breakfast cereal box mapped to a height of 100 mm and a width of 80 mm. At 912, the pixel-to-physical dimension ratio engine 207 determines a plurality of pixel-to-physical dimension ratios by dividing the pixel dimension of the region of interest for each identified product by each one of the physical dimensions in the list of physical dimensions. At 914, the pixel-to-physical dimension ratio engine 207 counts a vote for each one of the pixel-to-physical dimension ratios. The pixel-to-physical dimension ratio engine 207 heuristically identifies a pixel-to-physical dimension ratio by a voting procedure. For example, the voting procedure may be based on the Hough transform voting. The pixel-to-physical dimension ratio engine 207 determines a plurality of pixel-to-physical dimension ratios (PPRs) using the pixel dimension of the region of interest for each identified product and all possible combinations of the pixel dimension with the set of physical dimensions as indexed in the SKU table for the identified products in the received image. For example, an "ABC" breakfast cereal box with a height in pixels (400) may have three known associated physical heights (225 mm, 150 mm, and 100 mm) as indexed in the SKU table for breakfast cereals. A set of possible pixel-to-physical dimension ratios can then be determined to be 400/225=1.77, 400/150=2.66, and 400/100=4. At 916, the pixel-to-physical dimension ratio engine 207 identifies a pixel-to-physical dimension ratio that accumulated a maximum number of votes as a selected pixel-to-physical dimension ratio. For example, the pixel-to-physical dimension ratio engine 207 may compute 33 possible pixel-to-physical dimension ratios and may receive 33 individual votes based on 11 "ABC" breakfast cereal boxes as identified in the received image. If an approximate value of a pixel-to-physical dimension ratio of 1.77 received a maximum number of votes as compared to the other pixel-to-physical dimension ratios, then the pixel-to-physical dimension ratio engine 207 identifies 1.77 as the selected pixel-to-physical dimension ratio.

At 918, the size engine 209 determines a physical dimension for each identified product by dividing the pixel dimension of the region of interest for each identified product by the selected pixel-to-physical dimension ratio. For example, if the height in pixels for a first "ABC" breakfast cereal box identified in the received image is 400 and the pixel-to-physical dimension ratio is determined to be 1.77, then the actual physical height is determined to be 400/1.77=225.9 mm. In another example, if the height in pixels for a second "ABC" breakfast cereal box identified in the received image is 265 and the pixel-to-physical dimension ratio is determined to be 1.77, then the actual physical height is determined to be 265/1.77=149.7 mm. In yet another example, if the height in pixels for a third "ABC" breakfast cereal box identified in the received image is 175 and the pixel-to-physical dimension ratio is determined to be 1.77, then the actual physical height is determined to be 175/1.77=98.9 mm. At 920, the size engine 209 determines a stock keeping unit identifier of each identified product in the image by using the physical dimension for each identified product to look up the SKU table. For example, the size engine 209 identifies that the first "ABC" breakfast cereal box with a calculated physical height of 225.9 mm is closest to a height of 225 mm associated with a one kilogram "ABC" breakfast cereal box in the SKU table and retrieves the SKU identifier for the one kilogram "ABC" breakfast cereal box to be "X123".

A system and method for identifying and distinguishing between stock keeping units of similar appearance that vary in size has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by an image processor, an image including a plurality of items;
identifying, by the image processor, each item in the image;
generating, by the image processor, a region of interest for each identified item in the image;
determining, by the image processor, a dimension of the region of interest for each identified item in the image, wherein the dimension of the region of interest is expressed in pixels;
determining, by a pixel-to-physical dimension ratio engine, a plurality of pixel-to-physical dimension ratios for each identified item using the dimension of the region of interest and a plurality of possible physical dimensions associated with each identified item;
identifying, by the pixel-to-physical dimension ratio engine, a selected pixel-to-physical dimension ratio among the plurality of pixel-to-physical dimension ratios; and
determining, by a size engine, a stock keeping unit identifier of each identified item in the image based on the selected pixel-to-physical dimension ratio and the dimension of the region of interest for each identified item.

2. The method of claim 1 wherein determining the plurality of pixel-to-physical dimension ratios for each identified item further comprises:

retrieving, by the pixel-to-physical dimension ratio engine, the plurality of possible physical dimensions associated with each identified item from a stock keeping unit table; and determining, by the pixel-to-physical dimension ratio engine, the plurality of pixel-to-physical dimension ratios by dividing the dimension of the region of interest of each identified item by each of the plurality of possible physical dimensions.

3. The method of claim 1 wherein identifying the selected pixel-to-physical dimension ratio among the plurality of pixel-to-physical dimension ratios further comprises:

counting, by the pixel-to-physical dimension ratio engine, a vote for each pixel-to-physical dimension ratio of the plurality of pixel-to-physical dimension ratios; and identifying, by the pixel-to-physical dimension ratio engine, a pixel-to-physical dimension ratio among the plurality of pixel-to-physical dimension ratios that accumulated a maximum number of votes as the selected pixel-to-physical dimension ratio.

4. The method of claim 1 wherein determining the stock keeping unit identifier of each identified item in the image further comprises:

determining, by the size engine, a physical dimension corresponding to each identified item by dividing the dimension of the region of interest by the selected pixel-to-physical dimension ratio; and determining, by the size engine, the stock keeping unit identifier of each identified item by using the physical dimension to lookup the stock keeping unit identifier in a stock keeping unit table.

5. The method of claim 4 wherein the physical dimension for each identified item is one from the group of: a height, a width, an area, and a diagonal length.

6. The method of claim 1 wherein the plurality of items have a similar appearance.

7. The method of claim 1 wherein the plurality of items vary only in size.

8. The method of claim 1 wherein the selected pixel-to-physical dimension ratio is identified based on Hough transform voting.

9. The method of claim 1 wherein the selected pixel-to-physical dimension ratio describes a relationship between a dimension, in pixels, of an identified item in the received image and a corresponding physical dimension of the item.

10. A system comprising:
one or more processors;
an image processor stored on a memory and executable by the one or more processors, the image processor configured to receive an image including a plurality of items, to identify each item in the image, to generate a region of interest for each identified item in the image, and to determine a dimension of the region of interest for each identified item in the image, wherein the dimension of the region of interest is expressed in pixels;
a pixel-to-physical dimension ratio engine stored on the memory and executable by the one or more processors, the pixel-to-physical dimension ratio engine coupled to the image processor and configured to determine a plurality of pixel-to-physical dimension ratios for each identified item using the dimension of the region of interest and a plurality of possible physical dimensions associated with each identified item, and to identify a selected pixel-to-physical dimension ratio among the plurality of pixel-to-physical dimension ratios; and
a size engine stored on the memory and executable by the one or more processors, the size engine coupled to the pixel-to-physical dimension ratio engine and configured to determine a stock keeping unit identifier of each identified item in the image based on the selected pixel-to-physical dimension ratio and the dimension of the region of interest for each identified item.

11. The system of claim 10 wherein the pixel-to-physical dimension ratio engine, to determine a plurality of pixel-to-physical dimension ratios for each identified item, is further configured to retrieve the plurality of possible physical dimensions associated with each identified item from a stock keeping unit table mapping physical dimensions of items to an item size and to determine the plurality of pixel-to-physical dimension ratios by dividing the dimension of the region of interest of each identified item by each of the plurality of possible physical dimensions.

12. The system of claim 10 wherein the pixel-to-physical dimension ratio engine to identify the selected pixel-to-physical dimension ratio among the plurality of pixel-to-physical dimension ratios is further configured to count a vote for each pixel-to-physical dimension ratio of the plurality of pixel-to-physical dimension ratios and to identify a pixel-to-physical dimension ratio among the plurality of pixel-to-physical dimension ratios that accumulated a maximum number of votes as the selected pixel-to-physical dimension ratio.

13. The system of claim 10 wherein the size engine to determine the stock keeping unit identifier of each identified item in the image is further configured to determine a physical dimension corresponding to each identified item by dividing the dimension of the region of interest by the selected pixel-to-physical dimension ratio and to determine the stock keeping unit identifier of each identified item by using the physical dimension to look up the stock keeping unit identifier in a stock keeping unit table.

14. The system of claim 10 wherein the physical dimension for each identified item is one from the group of: a height, a width, an area, and a diagonal length.

15. The system of claim 10 wherein the plurality of items have a similar appearance.

16. The system of claim 10 wherein the plurality of items vary only in size.

17. A computer program product comprising a non-transitory computer readable medium storing a computer readable program, wherein the computer readable program when executed causes a computer to perform operations comprising:
receiving an image including a plurality of items;
identifying each item in the image;
generating a region of interest for each identified item in the image;
determining a dimension of the region of interest for each identified item in the image, wherein the dimension of the region of interest is expressed in pixels;
determining a plurality of pixel-to-physical dimension ratios for each identified item using the dimension of the region of interest and a plurality of possible physical dimensions associated with each identified item;
identifying a selected pixel-to-physical dimension ratio among the plurality of pixel-to-physical dimension ratios; and
determining a stock keeping unit identifier of each identified item in the image based on the selected pixel-to-physical dimension ratio and the dimension of the region of interest for each identified item.

18. The computer program product of claim 17 wherein determining the plurality of pixel-to-physical dimension ratios for each identified item further comprises:

retrieving the plurality of possible physical dimensions associated with each identified item from a stock keeping unit table; and determining the plurality of pixel-to-physical dimension ratios by dividing the dimension of the region of interest of each identified item by each of the plurality of possible physical dimensions.

19. The computer program product of claim 17 wherein identifying the selected pixel-to-physical dimension ratio among the plurality of pixel-to-physical dimension ratios further comprises:

counting a vote for each pixel-to-physical dimension ratio of the plurality of pixel-to-physical dimension ratios; and identifying a pixel-to-physical dimension ratio among the plurality of pixel-to-physical dimension ratios that accumulated a maximum number of votes as the selected pixel-to-physical dimension ratio.

20. The computer program product of claim 17 wherein determining the stock keeping unit identifier of each identified item in the image further comprises:

determining a physical dimension corresponding to each identified item by dividing the dimension of the region of interest by the selected pixel-to-physical dimension ratio; and determining the stock keeping unit identifier of each identified item by using the physical dimension to look up the stock keeping unit identifier in a stock keeping unit table.

* * * * *